United States Patent
Sherkat et al.

(10) Patent No.: US 11,514,027 B2
(45) Date of Patent: Nov. 29, 2022

(54) PAGED HYBRID LOBS

(71) Applicant: SAP SE, Walldorf (DE)

(72) Inventors: Reza Sherkat, Waterloo (CA); Chaitanya Gottipati, Pune (IN); Colin Florendo, Marlborough, MA (US); Martin Heidel, Walldorf (DE)

(73) Assignee: SAP SE, Walldorf (DE)

( * ) Notice: Subject to any disclaimer, the term of this patent is extended or adjusted under 35 U.S.C. 154(b) by 188 days.

(21) Appl. No.: 16/857,982

(22) Filed: Apr. 24, 2020

(65) Prior Publication Data

US 2020/0387487 A1  Dec. 10, 2020

Related U.S. Application Data

(60) Provisional application No. 62/858,693, filed on Jun. 7, 2019.

(51) Int. Cl.
*G06F 16/22* (2019.01)
*G06F 16/23* (2019.01)
(Continued)

(52) U.S. Cl.
CPC ........ *G06F 16/2379* (2019.01); *G06F 3/0604* (2013.01); *G06F 3/064* (2013.01); *G06F 3/0673* (2013.01); *G06F 9/4843* (2013.01); *G06F 12/0223* (2013.01); *G06F 12/0246* (2013.01); *G06F 12/0875* (2013.01); *G06F 12/0882* (2013.01); *G06F 16/221* (2019.01); *G06F 16/2219* (2019.01); *G06F 16/2228* (2019.01); *G06F 16/2237* (2019.01); *G06F 16/2255* (2019.01); *G06F 16/2272* (2019.01);
(Continued)

(58) Field of Classification Search
CPC ............. G06F 16/2219; G06F 16/2272; G06F 16/2228–2272; G06F 16/22–2219
See application file for complete search history.

(56) References Cited

U.S. PATENT DOCUMENTS 8,972,465 B1 * 3/2015 Faibish .................. G06F 16/13
707/822
9,817,858 B2  11/2017 Eisenreich et al.
(Continued)

OTHER PUBLICATIONS

Abadi, S. et al., "The Design and Implementation of Modern Column-Oriented Database Systems," Foundations and Trends in Databases, vol. 5, No. 3, Now Publishers Inc., 2012, pp. 177-280.
(Continued)

*Primary Examiner* — James Trujillo
*Assistant Examiner* — Michal Bogacki
(74) *Attorney, Agent, or Firm* — Sterne, Kessler, Goldstein & Fox P.L.L.C.

(57) ABSTRACT

Disclosed herein are system, method, and computer program product embodiments for storing a large object (LOB) in a database. An embodiment operates by identifying the LOB to be stored in an on-disk store of the database and determining the size of the LOB. Thereafter, an index vector for the on-disk store to include an identifier corresponding to the LOB is created. Additionally, a dictionary for the on-disk store to include a copy of the identifier and corresponding LOB data is also created. The LOB data corresponds to the LOB itself or a LOB location inside of the on-disk store based on the LOB's size.

20 Claims, 7 Drawing Sheets

(51) Int. Cl.
　　　G06F 12/02　　　(2006.01)
　　　G06F 3/06　　　(2006.01)
　　　G06F 12/0882　(2016.01)
　　　G06F 16/2455　(2019.01)
　　　G06F 12/0875　(2016.01)
　　　G06F 9/48　　　(2006.01)

(52) U.S. Cl.
　　　CPC .... *G06F 16/2282* (2019.01); *G06F 16/24552* (2019.01); *G06F 16/24558* (2019.01); *G06F 2212/1024* (2013.01); *G06F 2212/1044* (2013.01)

(56) References Cited

U.S. PATENT DOCUMENTS

| | | | |
|---|---|---|---|
| 9,852,169 | B2 | 12/2017 | Faerber et al. |
| 10,474,652 | B2* | 11/2019 | Baskett .................. G06F 16/22 |
| 11,204,895 | B1* | 12/2021 | Paterra .................. G06F 16/13 |
| 2002/0099691 | A1* | 7/2002 | Lore .................. G06F 16/2237 |
| 2010/0228708 | A1* | 9/2010 | Lehr ..................... G06F 16/10 707/758 |
| 2012/0089775 | A1* | 4/2012 | Ranade ............... G06F 16/183 711/170 |
| 2015/0142819 | A1* | 5/2015 | Florendo .............. G06F 16/22 707/741 |
| 2016/0012089 | A1* | 1/2016 | Sherkat ............... G06F 16/221 707/693 |
| 2016/0147778 | A1* | 5/2016 | Schreter ............ G06F 16/2358 707/674 |
| 2017/0322960 | A1* | 11/2017 | Glebe .................. G06F 3/0674 |
| 2017/0364554 | A1* | 12/2017 | Nica .................. G06F 16/2228 |
| 2018/0275886 | A1* | 9/2018 | Zhang .................. G06F 3/0685 |

OTHER PUBLICATIONS

Aken, D.V. et al., "Automatic Database Management System Tuning Through Large-scale Machine Learning," ACM SIGMOD '17, May 14-19, 2017, pp. 1009-1024.

Alexiou, K. et al. "Adaptive Range Filters for Cold Data: Avoiding Trips to Siberia," Proc. of the VLDB Endowment, vol. 6, No. 14, 2013, pp. 1714-1725.

Anderson, T., "Microsoft SQL Server 14 man: Nothing stops a Hekaton transaction," The Register, printed from http://www.theregister.co.uk/2013/06/03/microsoft_sql_server_14_teched/, Jun. 3, 2013, 8 pages.

Andrei, M. et al., "SAP HANA Adoption of Non-Volatile Memory," Proc. of the VLDB Endowment, vol. 10, No. 12, 2017, pp. 1754-1765.

Anh, V.N. and Moffat, A., "Index compression using 64-bit words," Software—Practice and Experience, vol. 40, 2010, pp. 131-147.

Arulraj, J. et al., "Multi-Tier Buffer Management and Storage System Design for Non-Volatile Memory," arXiv:1901.10938v1 [cs.DB], Jan. 30, 2019, 17 pages.

Belazzougui, D. et al., "Hash, displace, and compress," Algorithms—ESA 2009, Proc. 17th Annual European Symposium, Copenhagen, Denmark, Sep. 7-9, 2009, pp. 682-603.

Bhattacharjee, B. et al., "Efficient Index Compression in DB2 LUW," VLDB '09, vol. 2, No. 2, 2009, pp. 1462-1473.

Do, J. et al., "Turbocharging DBMS Buffer Pool Using SSDs," ACM SIGMOD, 2011, pp. 1113-1124.

Eldawy, A. et al., "Spatial Partitioning Techniques in SpatialHadoop," Proc. of the VLDB Endowment, vol. 8, No. 12, 2015, pp. 1602-1605.

Elghandour, I. et al., "An XML Index Advisor for DB2," ACM SIGMOD'08, Jun. 9-12, 2008, 4 pages.

Finkelstein, S. et al., "Physical Database Design for Relational Databases," ACM Trans. on Database Systems, vol. 13, No. 1, Mar. 1988, pp. 91-128.

Graefe, G. et al., "In-memory Performance for Big Data," Proc. of the VLDB Endowment, vol. 8, No. 1, 2014, pp. 37-48.

Graefe, G., "Volcano—An Extensible and Parallel Query Evaluation System," IEEE Trans. on Knowledge and Data Engineering, vol. 6, No. 1, Feb. 1994, pp. 120-135.

Gurajada, A. et al., "BTrim—Hybrid In-Memory Database Architecture for Extreme Transaction Processing in VLDBs," Proc. of the VLDB Endowment, vol. 11, No. 12, 2018, pp. 1889-1901.

Lang, H. et al., Data Blocks: Hybrid OLTP and OLAP on Compressed Storage using both Vectorization and Compilation. ACM SIGMOD, 2016, pp. 311-326.

Larson, P. et al., "Real-Time Analytical Processing with SQL Server," Proc. of the VLDB Endowment, vol. 8, No. 12, Aug. 31-Sep. 4, 2015, pp. 1740-1751.

Lee, J. et al., "Hybrid Garbage Collection for Multi-Version Concurrency Control in SAP HANA," ACM SIGMOD, Jun. 26-Jul. 1, 2016, pp. 1307-1318.

Leis, V. et al., "LeanStore: In-Memory Data Management Beyond Main Memory," IEEE ICDE, 2018, pp. 185-196.

Lemke, C. et al., "Speeding Up Queries in col. Stores—A Case for Compression," DAWAK, 2010, pp. 117-129.

Liu, X. and Salem, K., "Hybrid Storage Management for Database Systems," Proc. of the VLDB Endowment, vol. 6, No. 8, Aug. 26-30, 2013, pp. 541-552.

Majewski, B.S. et al., "A Family of Perfect Hashing Methods," The Computer Journal, vol. 39, No. 6., 1996, pp. 547-554.

May, N. et al., "SAP HANA—The Evolution of an In-Memory DBMS from Pure OLAP Processing Towards Mixed Workloads," BTW, 2017, pp. 545-563.

Menon, P. et al., "Relaxed Operator Fusion for In-Memory Databases: Making Compilation, Vectorization, and Prefetching Work Together at Last," Proc. of the VLDB Endowment, vol. 11, No. 1, 2017, pp. 1-13.

Müller, I. et al., "Adaptive String Dictionary Compression in In-Memory Column-Store Database Systems," Open Proceedings, 10.5441/002/edbt.2014.27, 2014, pp. 283-294.

Müller, I. et al., "Retrieval and Perfect Hashing Using Fingerprinting." J. Gudmundsson and J. Katajainen (Eds.), SEA 2014: Experimental Algorithms, Springer International Publishing, 2014, pp. 138-149.

Nehme, R. and Bruno, N., "Automated Partitioning Design in Parallel Database Systems," In ACM SIGMOD, 2011, pp. 1137-1148.

Neumann, T., Efficiently Compiling Efficient Query Plans for Modern Hardware, Proc. of the VLDB Endowment, vol. 4, No. 9, 2011, pp. 539-550.

Nica, A. et al., "Statisticum: Data Statistics Management in SAP HANA," Proc. of the VLDB Endowment, vol. 10, No. 12, 2017, pp. 658-1669.

On, S.T. et al., "FD-Buffer: A Buffer Manager for Databases on Flash Disks," ACM CIKM '10, Oct. 25-29, 2010, pp. 1297-1300.

Oracle® Database—Database In-Memory Guide, 19c, E96137-03, downloaded from https://docs.oracle.com/en/database/oracle/oracle-database/19/inmem/, Copyright 2016, 2020, 255 pages.

Pathak, A. et al., "Adaptive storage and access for simplified data management," *DaMoN* '19, Jul. 1, 2019, 6 pages.

Plaisance, J. et al., "Vectorized VByte Decoding," 1st Int'l Symp. on Web AlGorithms, Jun. 2015, 7 pages.

Plattner, H., "The Impact of Columnar In-memory Databases on Enterprise Systems: Implications of Eliminating Transaction-Maintained Aggregates," Proc. of the VLDB Endowment, vol. 7, No. 13, Sep. 1-5, 2014, pp. 1722-1729.

Poess, M. and Potapov, D., "Data Compression in Oracle," Proc. of the VLDB Conference, 2003, pp. 937-947.

Sacco, G.M. and Schkolnick, M., "A Mechanism For Managing The Buffer Pool In A Relational Database System Using Tire Hot Set Model," Proc. of the Eighth Int'l. Conf. on Very Large Data Bases, Sep. 1982, pp. 257-262.

Sherkat, R. et al., "Page As You Go: Piecewise Columnar Access In SAP HANA," ACM SIGMOD '16, Jun. 26-Jul. 1, 2016, pp. 1295-1306.

Stoica, R. and Ailamaki, A., Enabling Efficient OS Paging for Main-Memory OLTP Databases. ACM DaMoN '13. 2013, 7 pages, 2013.

(56) References Cited

OTHER PUBLICATIONS

Willhalm, T. et al., "Vectorizing Database Column Scans with Complex Predicates," ADMS 2013, pp. 1-12.
Xie, D. et al., "Simba: Efficient In-Memory Spatial Analytics," ACM SIGMOD '16, Jun. 26-Jul. 1, 2016, pp. 1071-1085.
Zilio, D.C. et al., "DB2 Design Advisor: Integrated Automatic Physical Database Design," Procs. Of the $30^{th}$ VLDB Conference, 2004, pp. 1087-1097.

\* cited by examiner

PAGED HYBRID LOBS

CROSS-REFERENCE TO RELATED APPLICATION

This application claims priority to provisional patent application No. 62/858,963, titled "Native Store Extension for Combined Workload Databases" to Sherkat et al, filed Jun. 7, 2019, which is herein incorporated by reference in its entirety.

BACKGROUND

Large objects (LOBs) are typically used to store large amounts of data. For example, LOBs can be images, audio, or other multimedia. LOBs can come in a variety of different forms, such as a binary large object (BLOB), a character large object (GLOB), and a national character large object (NCLOB). Databases can store LOBs on-disk or in-store. However, based on their sheer size, LOBs can create a large footprint on the database. Additionally, LOBs can require additional processing power from databases. Consequently, databases may be unable to completely and sufficiently process databases comprising LOBs and/or fully meet the expectations of users.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for proving large objects (LOBs) on demand.

In some embodiments, a database may include a manager, an in-memory store, and an on-disk store. Accordingly, in storing LOBs in the database in a fashion to provide on-demand access to LOBs, the manager can create an index vector and a dictionary for the on-disk store. In creating the index vector, the manager can generate identifiers corresponding to the LOBs. The manager can do so using an n-bit compression scheme. In doing so, each identifier in the index vector can have a consecutive bit representation.

Further, in creating the dictionary, the manager can include the index vector's identifiers and LOB data corresponding to the identifier's LOB. Depending on the size of the LOB, the LOB data can be the LOB itself or the LOB location in the on-disk store. In some embodiments, where the LOBs are small (e.g., less than 1000 bytes), the dictionary can include the LOB and, optionally, compress the LOB. And, where the LOBs are medium or large (e.g., 1000 bytes or more), the manager can store the LOB in a dedicated location in the on-disk store. For example, where the LOBs are medium (e.g., from 1000 bytes to 4000 bytes), the manager can store the LOBs in a container of the on-disk store and reference a location in the on-disk store. And, where the LOBs are large (e.g., more than 4000 bytes), the manager can store the LOBs in dedicated files of the on-disk store.

Along these lines, in some embodiments, in creating the index vector and/or dictionary, the manager can use one or more pages of the on-disk store. Accordingly, in some embodiments, the manager can store the index vector on consecutive pages of the on-disk store. Likewise, the manager can also store the dictionary on successive pages of the on-disk store. When storing the dictionary on one or more pages of the on-disk store, the manager can create a data structure comprising a page number and a page offset of the appropriate LOB data.

Accordingly, when processing user requests with respect to LOBs stored in the database, the manager can first determine the appropriate value identifier from the index vector stored in the on-disk store. Thereafter, using the identifier, the manager can identify corresponding LOB data. In some embodiments, where the dictionary is paged, the manager can use the dictionary's data structure to determine the page number and offset of the corresponding LOB data.

As stated above, depending on the size of the LOB, the LOB data can be the LOB itself or the LOB location in the on-disk store (e.g., a container or a dedicated file). If the LOB data is the LOB itself, the manager can load the LOB from the on-disk store into the in-memory store. However, if the LOB data is a location of the on-disk store, the manager can retrieve the LOB from the dedicated location and load the LOB into the in-memory store. The manager can then perform one or more actions related to the LOB in the in-memory store.

By operating in such a fashion, the footprint of the database's in-memory store and/or on-disk store are significantly reduced. As a result, the database is able to process user requests relating to LOBs more efficiently. Likewise, the computing device or system supporting the database is not required to have expensive hardware to process user requests relating to LOBs efficiently. In turn, LOBs are provided to on-demand, irrespective of the underlying computing device or system's hardware.

Figure 1:
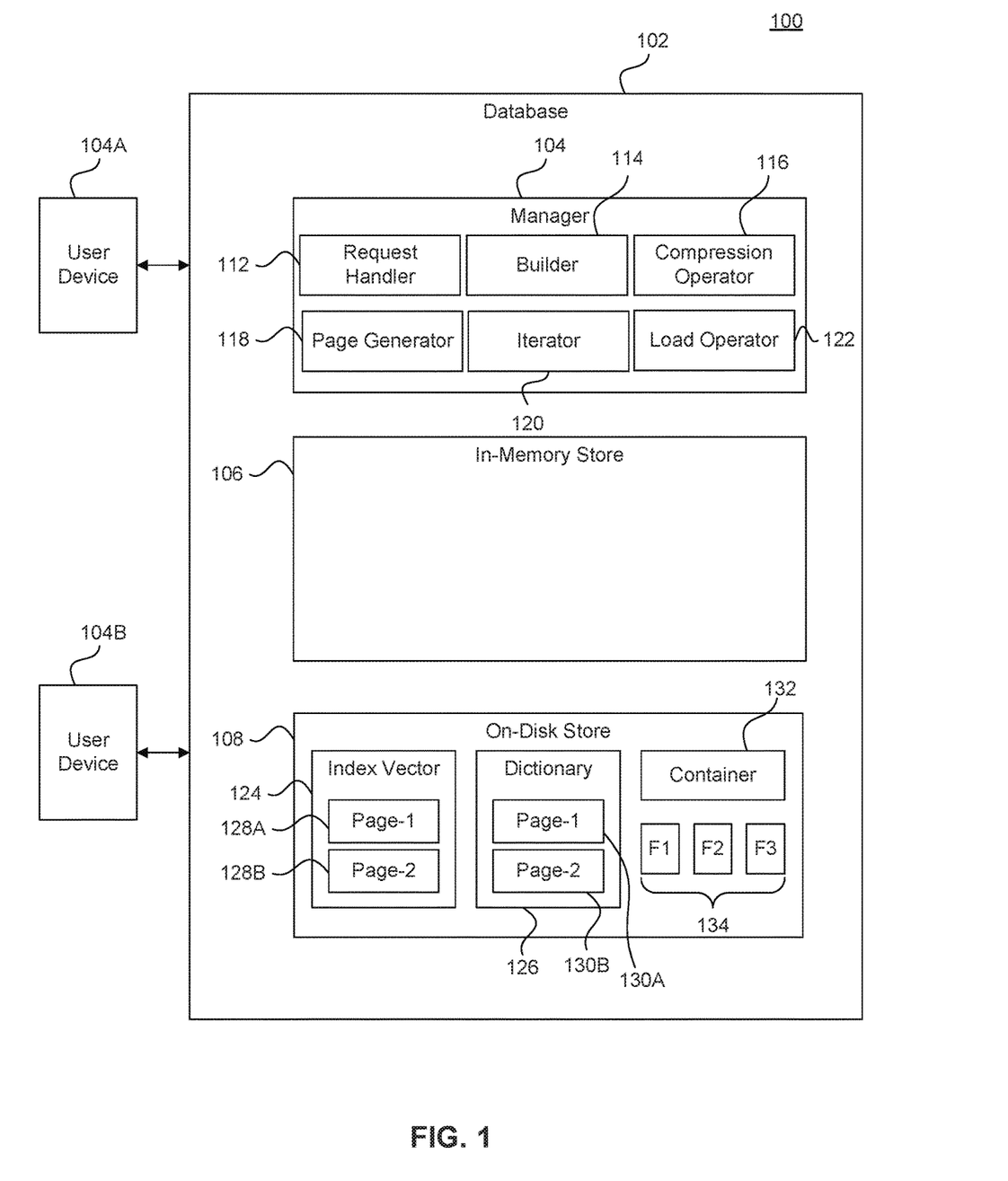
FIG. 1 is a block diagram of a system for storing large objects (LOBs), according to some embodiments.

FIG. 1 illustrates a system 100 for storing LOBs, according to some embodiments. System 100 can include database 102 and/or user devices 104A and 104B. Database 102 can include data (e.g., business data) relating to LOBs in in-memory store 106 and on-disk store 108, as will be discussed in more detail below. As such, database 102 can receive user requests from user devices 104A and 104B for processing operations with respect to LOBs. In some embodiments, user requests can relate to receiving specific LOBs or performing operations on the LOBs. For example, user requests may relate to receiving customers of a certain demographic (e.g., age, population, race, etc.). User requests may also relate to executing operations (e.g., joining, removing, merging, adding, etc.) of data. As such, user requests may not require the receipt of data.

Database 102 can include manager 104, in-memory store 106, and/or on-disk store 108. Manager 104 can include request handler 112, builder 114, compression operator 116, page generator 118, Aerator 120, and/or load operator 122. As will be discussed in more detail below, request handler 112 can receive user requests from user devices 104A and 104B.

Builder 114 can create index vector 124 and/or dictionary 126 for on-disk store 108. To create index vector 124, builder 114 can analyze data entries in one or more columns of a columnar database. Builder 114 can then identify one or more columns of the columnar database, where the column(s) include LOBS. Builder 114 can then create index vector 124 based on the column(s) having LOBs. Accordingly, index vector 124 can also be provided in a columnar fashion. Along these lines, in some embodiments, index vector 124 can include multiple columns in a sequential manner such that the first column is followed by the second column followed by the third column and so on. By organizing data in such a fashion, index vector 124's $10^{th}$ entry for a first column can correspond to the $10^{th}$ entry for another column. For example, one column can correspond to written identifiers, and another column can correspond to the correspond LOB.

Figure 2:
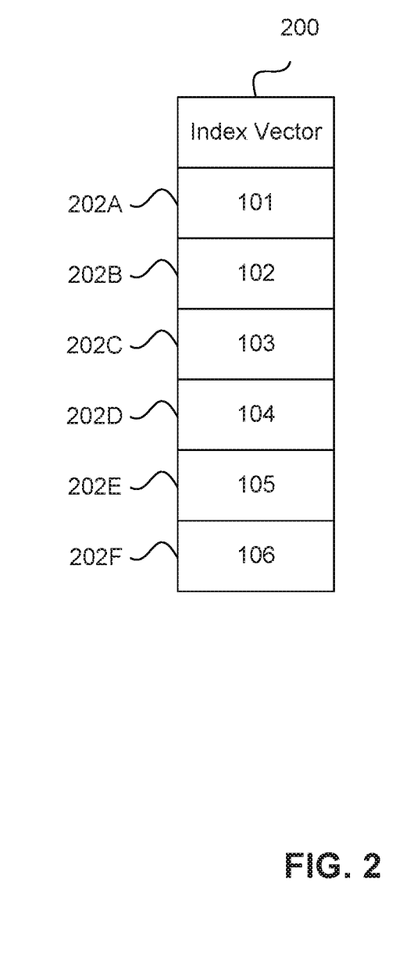
FIG. 2 illustrates an index vector that includes identifiers corresponding to LOBS, according to some embodiments.

After identifying columns from a columnar database for creating index vector 124, builder 114 can provide unique identifiers for each LOB. In some embodiments, compression operator 116 can perform an n-bit compression scheme on the written identifiers to create the unique identifiers. Compression operator 116's n-bit compression scheme can be independent of a bit architecture (e.g., 32-bit or 64-bit architecture) of a computing device that processes database 102. For example, compression operator 116's n-bit compression scheme can determine the total number of bits required to represent each row of a column. Compression operator 116's n-bit compression scheme can then provide consecutive bit representations to each row of the column. FIG. 2 illustrates index vector 200 having unique identifiers 202A-F. As shown, unique identifiers 202A-F can be represented as bits, which can be consecutive.

Referring to FIG. 1, in some embodiments, builder 114 can store index vector 124 on one or more pages 128A and 128B of a chain of pages of on-disk store 108. In doing so, page generator 118 can encode identifiers on pages 128A and 128B as a predefined number of identifiers, which can be independent of the number of bits required to represent all identifiers. For example, page generator 118 may provide identifiers on pages 128A and 128B as groups of compressed identifiers (e.g., unique identifiers). However, any required number of bits can be utilized, and, by doing so, each identifier 202A-F multiplied by the number of bits (e.g., 64) will result in a complete (i.e., full) word encoding. Further, page generator 118 can ensure that identifiers in entirety are provided on pages 128A and 128B such that pages 128A and 128B include complete identifiers 202A-F.

Figure 3:
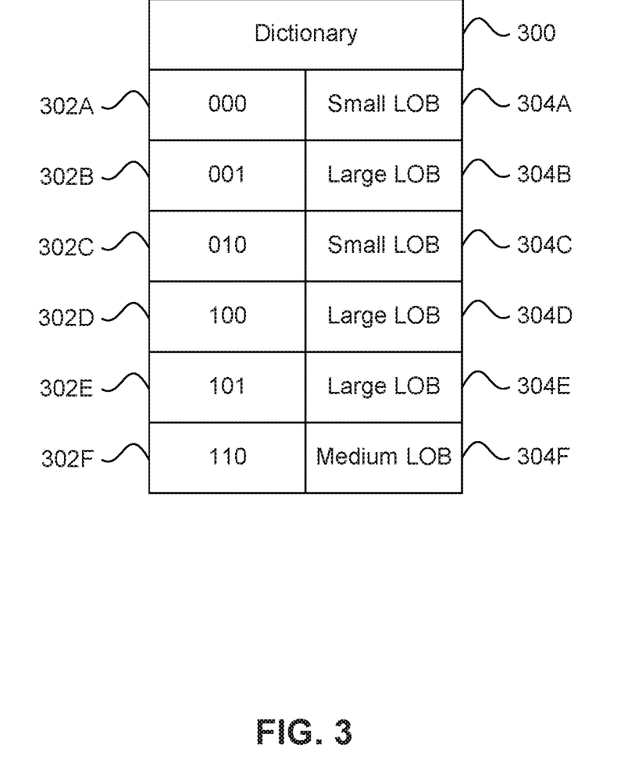
FIG. 3 illustrates a dictionary for identifying a LOB using an identifier, according to some embodiments.

As stated above, builder 114 can also create dictionary 126 for on-disk store 108. In doing so, builder 114 can create index vector 124's identifiers and LOB data corresponding to the identifier's LOB. As illustrated in FIG. 3, dictionary 300 can include identifiers 302A-F and corresponding LOB data 304A-F. The dictionary 300's identifiers 302A-F can be provided in the same order as the index vector 200's identifier 202A-F (of FIG. 2). Depending on the size of the LOB, LOB data 304A-F may be the LOB itself or a location for retrieving the LOB. In some embodiments, for small-sized LOBs, LOB data 304A-F may be the LOBs itself. For medium-sized LOBs or large-sized LOBs, LOB data can correspond to a location in on-disk store 108 (of FIG. 1) for retrieving the LOBs. For example, for medium-sized LOBs, the LOB data can correspond to on-disk store 108's container 132 (of FIG. 1). As will be explained in more detail below, the LOB data can be a LOB identifier. Accordingly, location can include a page number and an offset. And, for large-sized LOBs, LOB data 304A-F can be to the physical location of one of on-disk store 108's files 134. Further, in some embodiments, compression operator 116 can also compress LOB data 304A-F (e.g., small-sized LOBs).

Figure 4:
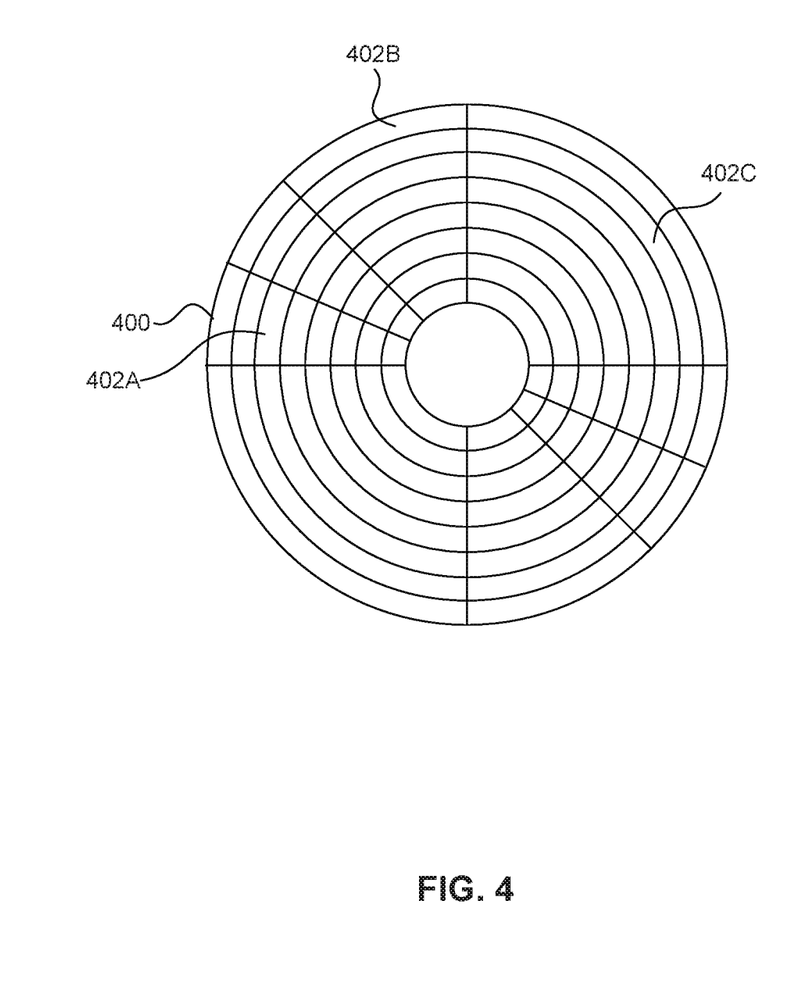
FIG. 4 illustrates an on-disk store of a database, according to some embodiments.

FIG. 4 illustrates disk storage 400 of an on-disk store for storing large-sized LOBs, according to some embodiments. Disk storage 400 can be divided into pages 402A-C. Pages 402A-C are storage units of disk storage 400 within the database. In some embodiments, pages 402A-C can have the same size. Pages 402A-C page can also be different sizes. For example, page 402A can be 4 KiB, page 402B can be 16 KiB, and page 402C can be 256 KiB, just to provide some examples.

Accordingly, large-sized LOBs can be saved as individual files 134 (of FIG. 1) using pages 402A-C. In some embodiments, a large-sized LOB may be saved on a particular 402A-C having a suitable size. For example, where pages 402A-C are different sizes, a large-sized LOB may be saved on a particular page 402A-C having sufficient storage capacity to store the large-sized LOB in its entirety. In some embodiments, large-sized LOBs can be larger than any particular page 402A-C and can thus be provided on a sequence of pages. Each page 402A-C of the sequence of pages can have a page identifier indicating a relative location of pages 402A-C in the sequence of pages.

Figure 5:
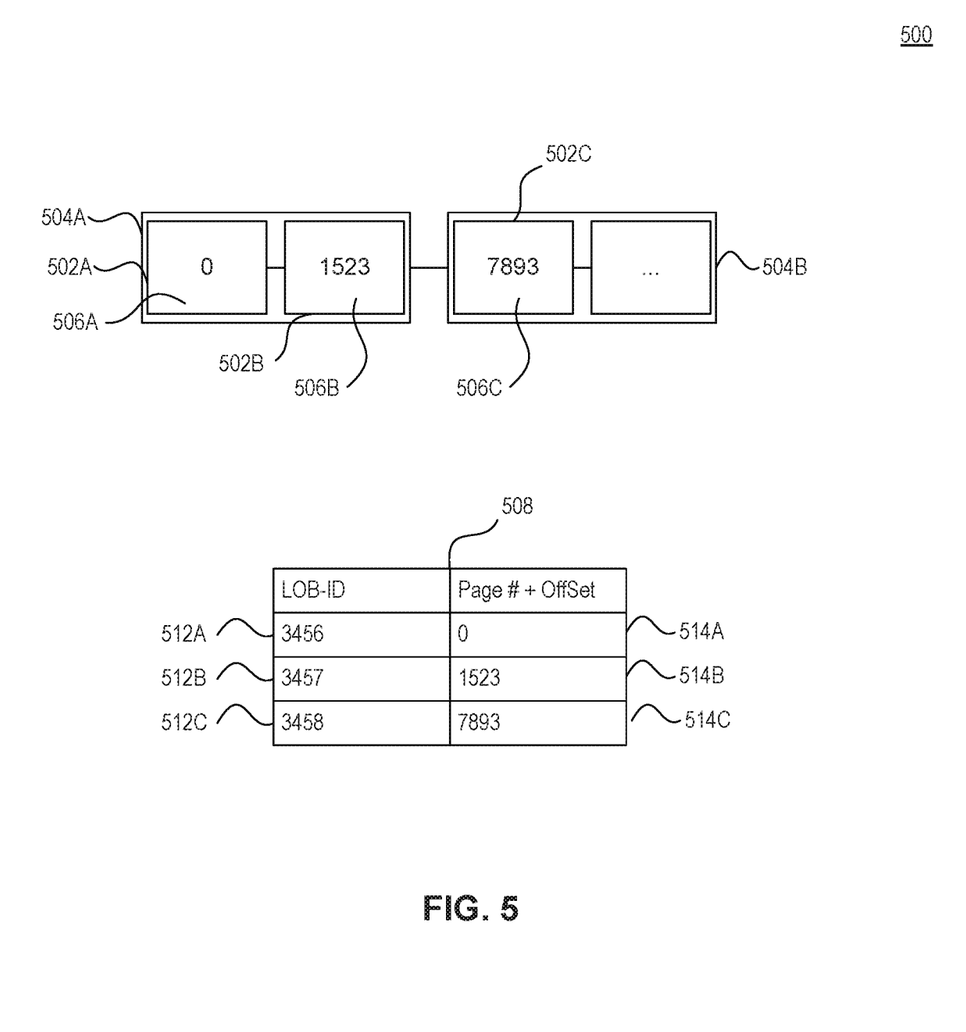
FIG. 5 illustrates a LOB container for storing medium-sized LOBs, according to some embodiments.

FIG. 5 is an illustration of a LOB container 500 for storing medium-sized LOBs, according to some embodiments. LOB container 500 can store one or more medium-sized LOBs 502A-C on a chain of pages that includes one or more pages 504A and 504B. In some embodiments, multiple medium-sized LOBs 504A and 504B can fit on a single page 502A. Where an individual page 502A or 502B is insufficient to store medium-sized LOBs, medium-sized LOBs can be stored on a sequence of pages 502A-C.

LOB container 500 can include data structure 508 that provides the location of the LOBs in the chain of pages. For each medium-sized LOB 502, data structure 508 can include LOB identifier 512A-C and location 514A-C of the LOB in the chain of pages. LOB identifiers 512A-C can be provided sequentially based on the location of LOBs in the chain of pages. For example, as shown, three consecutive LOBs can have identifiers "3456," "3457," and "3456," respectively. Further, in some embodiments, LOB 502A-C's location 514A-C can include a page number of a sequence of pages and an offset on the particular page. The offset 514A-C can indicate the number of bytes from the beginning of the particular page at which LOBs resides. Accordingly, offset 514A-C can include an indication of the start of LOBs.

Referring to FIG. 1, in some embodiments, in constructing dictionary 126, builder 114 can store corresponding LOB data on one or more pages 130A and 130B in a similar fashion as index vector 124. In doing so, page generator 118 can attempt to provide LOB data in its entirety on a single page 130A or 130B. For example, in some embodiments, a particular page 130A or 130B can include previous LOB data (e.g., other small-sized LOBs) or can be completely blank (e.g., does not have any data stored thereon). Page generator 118 can determine whether pages 130A and 130B have sufficient capacity for subsequent LOB data.

Accordingly, depending on the size of the LOB data and pages 130A and 130B, LOB data can be smaller or larger than pages 130A and 130B. Page generator 118 can then divide LOB data into segments such that each segment is to be provided onto consecutive pages 130A and 130B and is no greater in size than its respective page 130A and 130B. Thus, in some embodiments, a particular page 130A can include different LOB data in its entirety or a portion thereof. By operating in such a fashion, page generator 118 can utilize pages 130A and 130B in their full capacity.

Along these lines, when storing LOB data on one or more pages 130A and 130B, page generator can create a data structure providing the location of the LOB data on one or more pages. The data structure can be similar to container 500's data structure 508. Dictionary 126's data structure can include index vector 124's identifiers and the LOB location data on one or more pages 130A and 130B. The location can include a page number and/or an offset. The offset can indicate the number of bytes from the beginning of the particular page at which LOBs resides.

After creating index vector 124 and/or dictionary 126, as stated previously, manager 104's request handle 118 can receive user requests with respect to LOBs from user devices 104A and 104B. In some embodiments, user requests can include a specific row position, or a specific range of row positions, in index vector 124. Request handle 118 can then determine a specific row position, or a specific range positions, associated with the user request.

Iterator 120 can thereafter traverse through index vector 124 to identify an identifier 202A-F (of FIG. 2) associated with the specific row position or with the ranges of the row positions. As discussed above, in some embodiments, index vector 124 can be provided for one or more pages 128A and 128B. Accordingly, iterator 120 can traverse pages 128A and 128B consecutively by, for example, starting from the first page to the last page. Along these lines, upon receiving the requested row position, iterator 120 can perform modulo division to identify a start point and an endpoint on one or more pages 128A and 128B based on the size of pages 128A and 128B and the number of identifiers (e.g., bits) used for encoding as discussed. Based on the start point and endpoint, iterator 120 can then identify page(s) 128A and 128B having the requested rows and identify appropriate value identifier(s) associated with the requested row on the identified page(s) 128A and 128B.

After determining identifiers from index vector 124, iterator 120 can use the identifiers to identify corresponding LOB data from dictionary 126. As described above, in some embodiments, the corresponding LOB data can be on one or more pages 130A and 130B, Accordingly, iterator 120 can acquire a location of the LOB data on one or more pages 130A and 130B from a data structure that maps the identifiers to the location of the LOB data on the pages 130A and 130B. Iterator 120 can then identify the LOB data with the location provided by the data structure. In some embodiments, compression operator 116 can decompress the LOB data.

As described above, in some embodiments, depending on a LOB's size, the LOB data can be the LOB itself or the LOB location outside of the dictionary 126. For example, in some embodiments, small-sized LOBs can be stored in dictionary 126. Accordingly, load operator 122 can retrieve the LOB data from dictionary 126 and place the LOB in in-memory store 106. However, in some embodiments, for medium- and large-sized LOB, the LOB data can correspond to a location outside of dictionary 126. And, for medium-sized and large-sized LOBs, the location can be on-disk store 108's container 132 and individual files 134, respectively.

Along these lines, as described above, in some embodiments, medium-sized LOBs can be stored on one or more pages of container 132. And, in some embodiments, container 132 can include a data structure including LOB identifiers and corresponding page numbers and offsets for the LOBs. Thus, for medium-sized LOBs, the LOB data can be the LOB identifier or the page and offset in container 132.

Accordingly, for medium-sized LOBs, load operator 122 can retrieve the LOB from container 132. For example, where the LOB data is a LOB identifier, iterator 120 can determine the page number and offset from container 132's data structure and then parse through container 132's one or more pages to identify the LOB data. Similarly, where the LOB data is a page number and offset for container 132's one or more pages, iterator 120 can parse through container 132's one or more pages to identify the LOB data. Load operator 122 can then load the LOB's data from this location in container 132 into in-memory store 106.

As stated previously, large-sized LOBs can be stored in on-disk store 108's individual tiles 134. Accordingly, for large-sized LOBs, the LOB data can be a physical location of individual files 134 in on-disk store 108. Thus, load operator 122 can load the LOB's data from this location into in-memory store 106.

After loading the LOB data from on-disk store 108 into in-memory store 106, request handler 112 can perform user requests with respect LOBs. For example, LOBs can be provided to user devices 104A and 104B to be viewed. LOBs can also be modified during merge, as well as any other type of action as would be understood by a person of ordinary skill.

Figure 6:
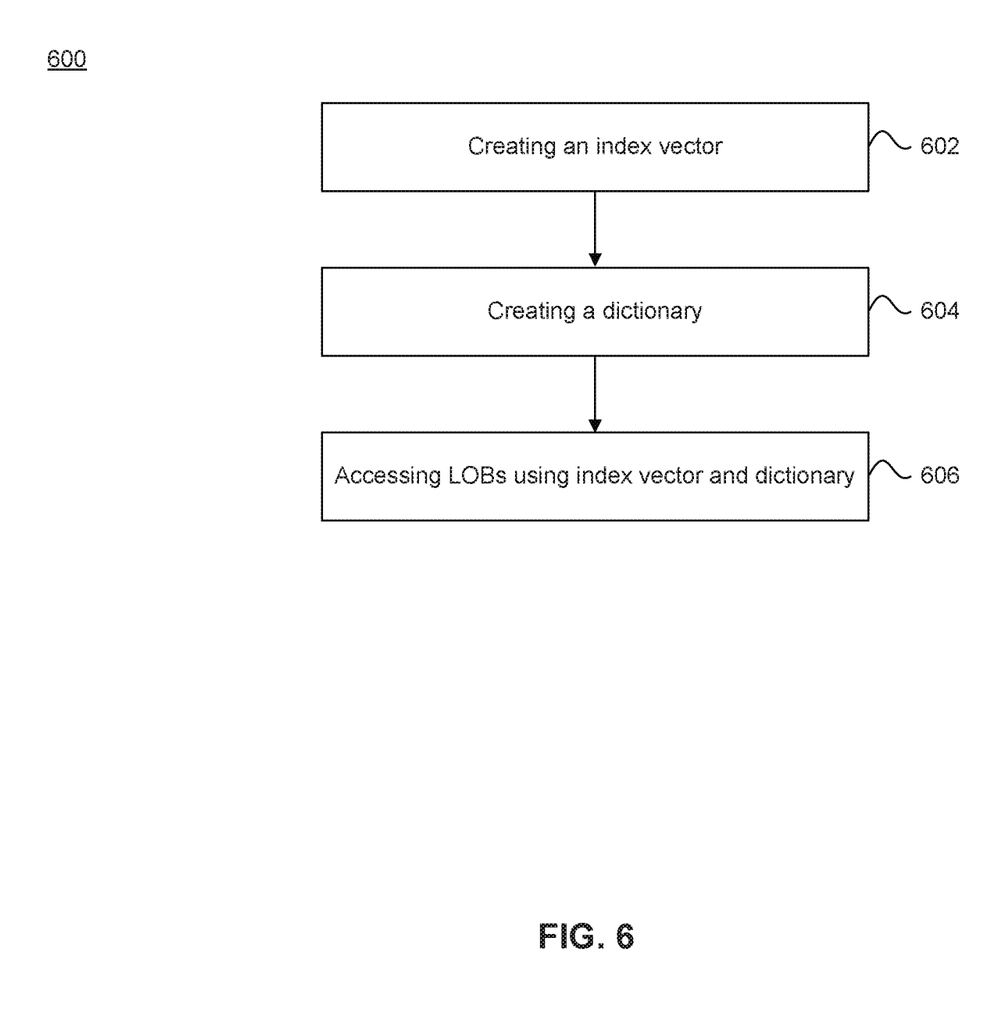
FIG. 6 is a flowchart illustrating a method for providing access to a LOB stored in a database, according to some embodiments.

FIG. 6 illustrates a flowchart for method 600 for providing access to a LOB stored in a database, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 6, as will be understood by a person of ordinary skill in the art.

Referring to FIG. 6, method 600 shall be described with reference to FIGS. 1 and 2. However, method 600 is not limited to those example embodiments.

In 602, database 102 creates index vectors 124 and 200 to include one or more identifiers 202A-F corresponding to LOBs. To do so, database 102 can analyze data entries one or more columns of a columnar database. Database 102 can then identify one or more columns of the columnar database, where the column(s) include LOBs. Database 102 can then create index vector 124 based on the column(s) having LOBs.

After identifying columns from a columnar database for creating index vector 124, database 102 can provide identifiers 202A-F for each LOB. In some embodiments, database 102 can perform an n-bit compression scheme on the written identifiers to create the identifiers 202A-F.

In 604, database 102 creates dictionary 126 and 300 to include the identifiers 302A-F and corresponding LOB data. The dictionary 300's identifiers 302A-F can be provided in the same order as the index vector 200's identifier 202A-F (of FIG. 2). Depending on the size of the LOB, LOB data 304A-F may be the LOB itself or a location for retrieving the LOB. In some embodiments, for small-sized LOBs, LOB data 304A-F may be the LOBs itself. For medium-sized LOBs or large-sized LOBs, LOB data can correspond to a location in on-disk store 108 (of FIG. 1) for retrieving the LOBs. For example, for medium-sized LOBs, the LOB data can correspond to on-disk store 108's container 132 (of FIG. 1).

In some embodiments, database 102 can create at least one of index vector 124 and 200 and dictionary 126 and 300 on one or more pages 128A, 128B, 130A, and 130B of on-disk store.

In 606, database 102 can provide access to LOBs stored in dictionary 126, container 132, and/or files 134. For example, users via user devices 104A and 104B can request operations on LOBs. Database 102 can determine value identifiers 202A-F corresponding to LOBs from index vector 124. Using the value identifiers 202A-F, database 102 can determine the corresponding LOB data from dictionary 126. If the LOBs are small, the LOB data can be the LOB itself. If the LOBs are medium or large, the LOB data can correspond to a location in container 132 or files 134.

Figure 7:
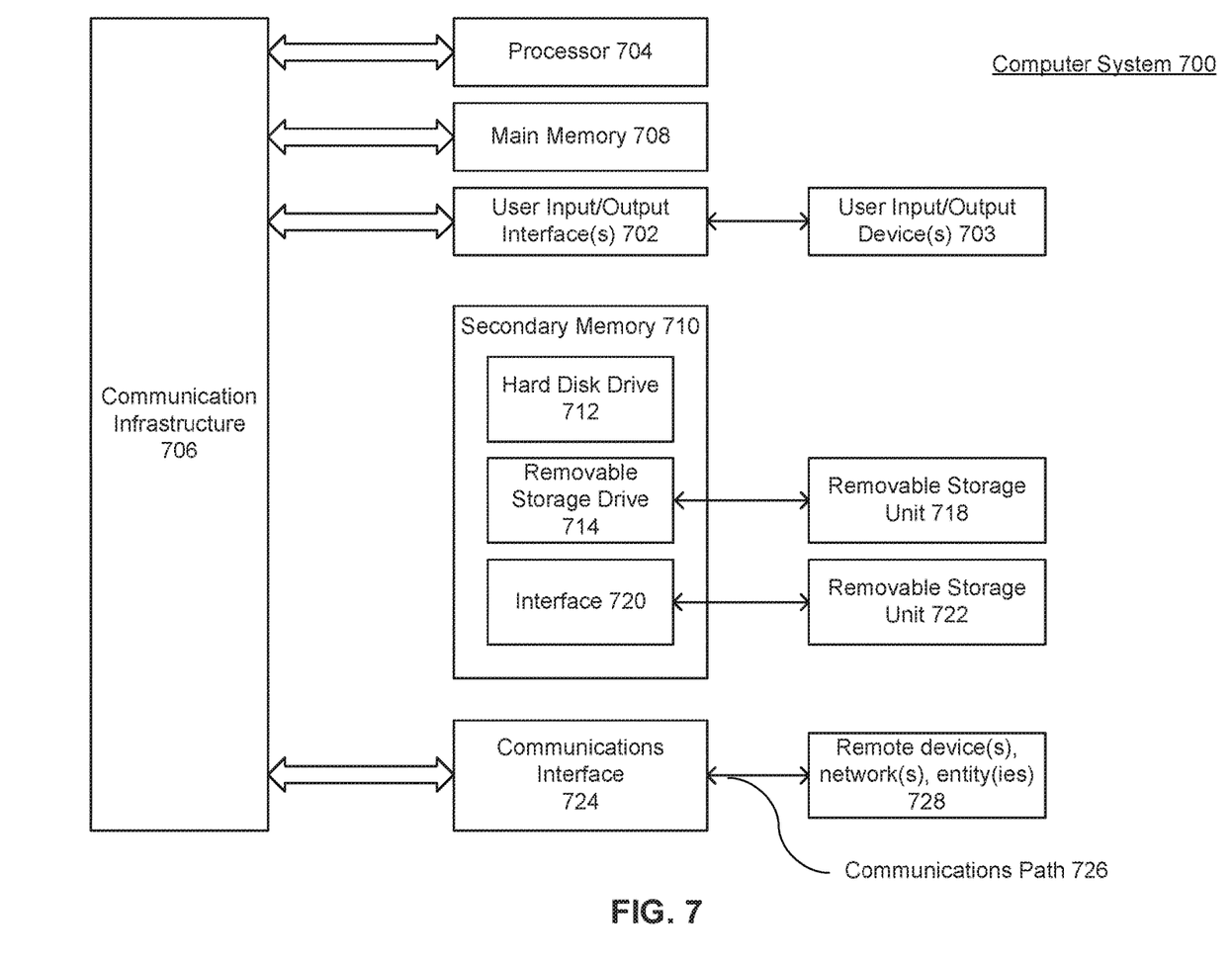
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for storing a large object (LOB) in a database, comprising:
    identifying the LOB to be stored in an on-disk store of the database instead of an in-memory store, wherein the database includes the on-disk store and the in-memory store;
    determining a size of the LOB;
    creating an index vector for the on-disk store to include an identifier corresponding to the LOB, wherein the index vector includes a first column followed by a second column being stored on a first set of one or more pages of a chain of pages of the on-disk store; and
    creating a dictionary for the on-disk store to include a copy of the identifier and corresponding LOB data, wherein the dictionary is stored on second set of one or more pages of the on-disk store different from the first set of one or more pages,
    wherein:
    the LOB data corresponds to the LOB or a location of the LOB inside the on-disk store based on the size of the LOB, and
    the index vector and the dictionary are utilized to retrieve the LOB from the on-disk store.

2. The computer-implemented method of claim 1, the creating of the index vector comprising:
    encoding the identifier on a page of the index vector.

3. The computer-implemented method of claim 1, the creating of the index vector comprising:
    generating the identifier corresponding to the LOB.

4. The computer-implemented method of claim 3, the generating of the identifier corresponding to the LOB comprising:
    generating the identifier corresponding to the LOB using an n-bit compression scheme.

5. The computer-implemented method of claim 1, the creating of the dictionary comprising:
    encoding LOB data on one page of the dictionary.

6. The computer-implemented method of claim 1, the creating of the dictionary further comprising:
    creating a data structure comprising the copy of the identifier and a location in the on-disk store.

7. The computer-implemented method of claim 6, wherein the location comprises a page number and a page offset.

8. The computer-implemented method of claim 1, the creating of the dictionary comprising:
    when the size of the LOB is at or below a first threshold, creating the index vector to include the identifier and the LOB; and
    when the size of the LOB exceeds the first threshold, creating the dictionary to include the identifier and LOB data corresponding to the location of the LOB inside the on-disk store.

9. The computer-implemented method of claim 8, the creating the dictionary further comprising:
    when the size of the LOB is at or below a second threshold that is greater than the first threshold, storing the LOB in a container of the on-disk store; and
    when the size of the LOB exceeds the second threshold, storing the LOB in a file of the on-disk store.

10. The computer-implemented method of claim 9, the creating the dictionary further comprising:
    compressing the LOB.

11. The computer-implemented method of claim 9, the storing the LOB in the container of the on-disk store comprising:
    encoding the LOB on a page of the container of the on-disk store.

12. The computer-implemented method of claim 11, the encoding the LOB on the page of the container of the on-disk store comprising:
    encoding the LOB on a first page and a second page of the container of the on-disk store.

13. The computer-implemented method of claim 9, the creating the dictionary further comprising:
creating a data structure comprising the copy of the identifier and the location of the LOB in the container storing the LOB,
wherein for the size of the LOB at or below the second threshold, the LOB data corresponds to the location in the container storing the LOB.

14. The computer-implemented method of claim 13, wherein the location in the container storing the LOB corresponds to at least one of a page number and a page offset.

15. The computer-implemented method of claim 1, the creating the dictionary further comprising:
compressing LOB data.

16. A system, comprising:
a memory; and
at least one processor coupled to the memory and configured to:
identify a large object (LOB) to be stored in an on-disk store of a database instead of an in-memory store, wherein the database includes the on-disk store and the in-memory store;
determine a size of the LOB;
create an index vector for the on-disk store to include an identifier corresponding to the LOB, wherein the index vector includes a first column followed by a second column being stored on a first set of one or more pages of a chain of pages of the on-disk store; and
create a dictionary for the on-disk store to include a copy of the identifier and corresponding LOB data, wherein the dictionary is stored on second set of one or more pages of the on-disk store different from the first set of one or more pages,
wherein:
the LOB data corresponds to the LOB or a location of the LOB inside the on-disk store based on the size of the LOB, and
the index vector and the dictionary are utilized to retrieve the LOB from the on-disk store.

17. The system of claim 16, wherein, to create the index vector, the at least one processor is configured to:
encode the identifier on a page of the index vector.

18. The system of claim 16, wherein, to create the dictionary, the at least one processor is configured to:
encode the LOB on a page of a container of the on-disk store.

19. The system of claim 16, wherein, to create the dictionary, the at least one processor is configured to:
when the size of the LOB is at or below a first threshold, create the index vector to include the identifier and the LOB; and
when the size of the LOB is at or below a second threshold greater than the first threshold, store the LOB in a container of the on-disk store; and
when the size of the LOB exceeds the second threshold, store the LOB in a file of the on-disk store.

20. A non-transitory computer-readable medium having instructions stored thereon that, when executed by at least one computing device, cause the at least one computing device to perform operations comprising:
identifying a large object (LOB) in a database to be stored in an on-disk store of the database instead of an in-memory store, wherein the database includes the on-disk store and the in-memory store;
determining a size of the LOB;
creating an index vector for the on-disk store to include an identifier corresponding to the LOB, wherein the index vector includes a first column followed by a second column being stored on a first set of one or more pages of a chain of pages of the on-disk store; and
creating a dictionary for the on-disk store to include a copy of the identifier and corresponding LOB data, wherein the dictionary is stored on second set of one or more pages of the on-disk store different from the first set of one or more pages,
wherein:
the LOB data corresponds to the LOB or a location of the LOB inside the on-disk store based on the size of the LOB, and
the index vector and the dictionary are utilized to retrieve the LOB from the on-disk store.

* * * * *